United States Patent [19]
Salvin et al.

[11] 3,858,011
[45] Dec. 31, 1974

[54] ELECTRICAL APPARATUS

[75] Inventors: Keith Thomas Salvin; David Silvester Lane, both of Sheffield, England

[73] Assignee: Strawson Hydraulics (Consultants) Limited, Sheffield, England

[22] Filed: Sept. 4, 1973

[21] Appl. No.: 394,137

[52] U.S. Cl. .......................... 191/12.2 R, 242/54 R
[51] Int. Cl. ............................................ H02g 11/00
[58] Field of Search .................... 191/12.2 R, 12.4; 137/355.16, 355.17, 355.20, 355.25; 242/54 R, 86; 254/183, 150 R

[56] References Cited
UNITED STATES PATENTS
3,128,857  4/1964  Walton .......................... 191/12.2 R
3,743,796  7/1973  Rosencrantz .................. 137/355.16

Primary Examiner—M. Henson Wood, Jr.
Assistant Examiner—D. W. Keen
Attorney, Agent, or Firm—Young & Thompson

[57] ABSTRACT

An electric cable reeling drum having a main drum and an auxiliary drum within it carrying a connecting wire in such a way that a direct and positive electrical connection is established to the cable and a considerable number of turns of the cable can be wound on the main drum without twisting of the connecting wire.

6 Claims, 2 Drawing Figures

ELECTRICAL APPARATUS

The invention relates to electrical apparatus and has for its object to provide an improvement therein.

It is a particular problem that when a weak electrical signal from an electrical proportioning device is to be fed by means of an electric cable to means for interpreting the signal, and it is desired to wind the cable on a cable reeling drum, it is not satisfactory to use commutator and carbon brush type arrangements to take off the electrical signal from the drum because such an arrangement would seriously affect the strength of the electrical signal. A direct and positive electrical connection is required from the electrical proportioning device to the means for interpreting the signal. The present invention aims to provide a means for establishing such a connection despite the fact that electric cable is to be wound upon a cable reeling drum.

According to one aspect of the invention, there is provided an electric cable reeling drum having a main drum with an auxiliary drum mounted eccentrically within it, spring means acting on the main drum to take up slack in the electric cable, said auxiliary drum carrying windings of a connecting wire for connecting an end of an electric cable wound on the main drum to fixed electrical apparatus, said connecting wire extending tangentially from the auxiliary drum to a fixed main bobbin at the centre of the main drum, the arrangement being such that the connecting wire is wound onto or paid off the main bobbin as the main drum rotates. The auxiliary drum will preferably be acted on by spring means to take up slack in the connecting wire as it is paid off the main bobbin. The main drum will preferably be acted upon by spring means to take up slack in the electric cable. The main bobbin will preferably be of a considerably smaller diameter than the auxiliary drum. The auxiliary drum will preferably be of hollow form with several turns of the connecting wire disposed within it, and an auxiliary bobbin fixed with respect to the main drum will preferably be disposed within the auxiliary drum, the arrangement being such that as the auxiliary drum rotates relative to the main drum the turns of connecting wire within said auxiliary drum will either be coiled upon the auxiliary bobbin or paid off the auxiliary bobbin to lie against the inner cylindrical surface of the auxiliary drum.

According to another aspect of the invention, there is provided an extensible boom crane having means including an electronic load cell for sensing the load carried by the boom, an electric cable through which an electrical signal from said load cell is transmitted to fixed electrical apparatus by means of direct and positive electrical connections, said electric cable being wound upon an electric cable reeling drum as described above.

In order that the invention may be fully understood and readily carried into effect, the same will now be described, by way of example only, with reference to the accompanying drawings, of which:

Figure 1:
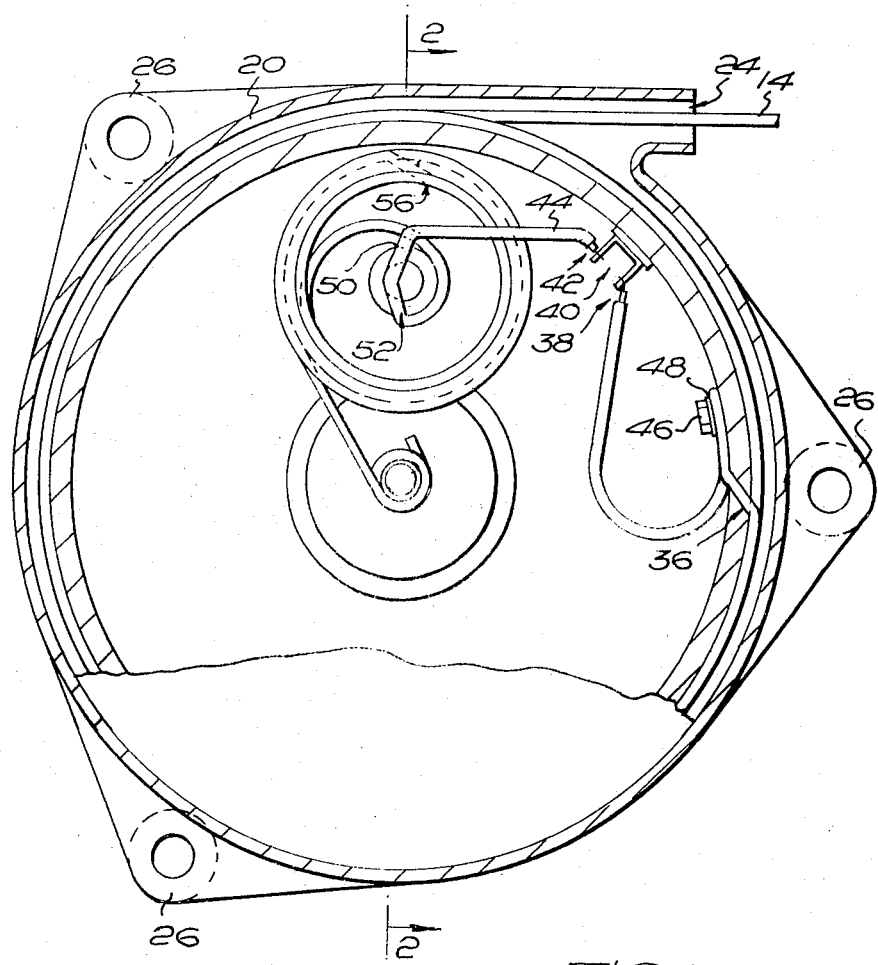
FIG. 1 is a sectional view of a cable reeling drum embodying the invention.

Referring now to the drawings, a cable reeling drum generally indicated 10 includes a main drum 12 on which a length of electric cable 14 is wound, said cable being connected to an electric load cell (not shown) forming part of means for sensing the load carried by the boom of an extensible boom crane. The main drum 12 is mounted on an annular spigot portion 16 of a mounting bracket 18 and a removable cowl 20 is a push fit on a cylindrical surface 22 of said mounting bracket and has an aperture 24 through which the electric cable extends. The mounting bracket has apertured lugs 26 by means of which the reeling drum is mounted on the crane.

An auxiliary drum 28 is mounted eccentrically within the main drum and is freely rotatable on a hollow sleeve member 30 which is held in position by a cap head screw 32. Spring means generally indicated 34 are however provided to urge the auxiliary drum in a clockwise sense as viewed in FIG. 1.

An inner end of the electric cable 14 extends through an aperture 36 in the cylindrical wall of the main drum and its leads 38 are connected at 40 to leads 42 of a connecting wire 44. A screw 46 and washer 48 are provided to clamp a portion of the cable 14 to the inner surface of the main drum so that, if all the cable is drawn off the drum, a pull cannot be transmitted to the electrical connections at 40.

Figure 2:
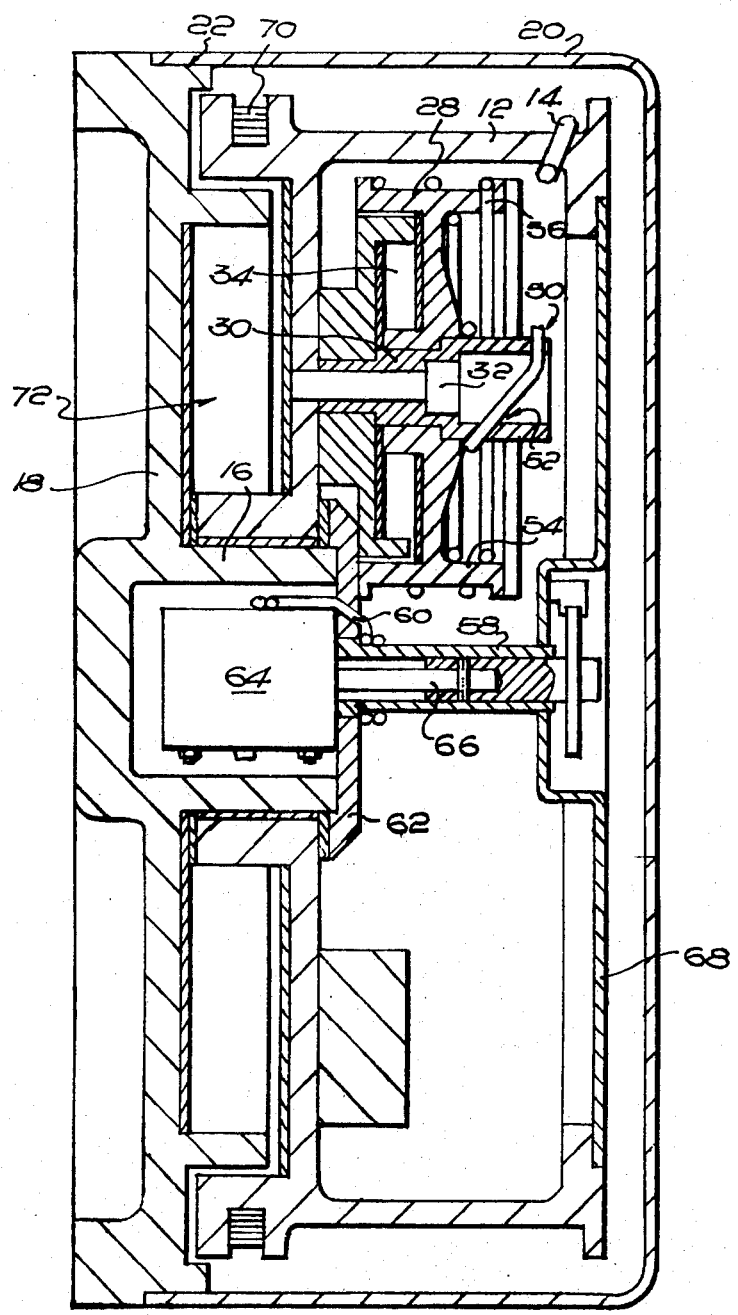
FIG. 2 is a sectional view on the line 2—2 in FIG. 1.

The connecting wire 44 extends through apertures 50 and 52 in the cylindrical wall of an enlarged head of the sleeve member 30 on which the auxiliary drum is mounted and, as shown in FIG. 2, emerges from the aperture 52 into a space within the cylindrical wall 54 of the auxiliary drum. (The enlarged head of the sleeve member 30 constitutes an auxiliary bobbin within the auxiliary drum and on which turns of the connecting wire within the auxiliary drum can be wound as the latter rotates relative to the main bobbin, the auxiliary bobbin being fixed relative to said main drum. It will be seen that in the embodiment illustrated there are two and a half turns of the connecting wire within the auxiliary drum). The wire then extends through an aperture 56 in the cylindrical wall of said drum and several turns of the wire are shown to be wound on its periphery. An end length of the wire then extends tangentially from the auxiliary drum and is wound around a main bobbin constituted by a fixed sleeve 58 at the axis of the main drum before extending through an aperture 60 in a cover plate 62 from which the fixed sleeve projects. Electrical apparatus generally indicated 64 is housed within the annular spigot portion 16 of the mounting bracket 18 and the leads of the connecting wire 44 are connected to said apparatus.

A direct drive to electrical proportioning apparatus (not shown) forming a part of the apparatus generally indicated 64 is constituted by a shaft 66 extending through the sleeve 58 and connected to a cover plate 68 secured to the front face of the main drum 12, said proportioning device being arranged to give an electrical signal proportional to the overall length of the extensible crane boom as indicated by the angular displacement of the main drum. The angular displacement of said drum as the boom is extended is effected by a steel tape 70, which is wound on the drum and extends to an outermost section of the boom, against the force of spring means generally indicated 72 which urge the drum in an anti-clockwise sense as viewed in FIG. 1. The drum rotates under the action of said spring means when the boom is retracted to wind in the steel tape and to take up slack in the electric cable 14.

The arrangement is such that a considerable length of electric cable 14 can be wound onto the main drum and subsequently drawn off the drum, necessitating a considerable number of drum rotations, despite the fact that there is a direct and positive electrical connection to fixed apparatus within the drum, and it will be seen that this is effected without twisting of the cable or of the connecting wire. As the main drum rotates, the connecting wire is wound onto or unwound from the fixed sleeve 58 and this rotates the auxiliary drum relative to the main drum (but at a very much reduced rate by virtue of the difference in diameter between the sleeve 58 and the auxiliary drum). As the auxiliary drum rotates, the turns of connecting wire within it are either wound onto the enlarged head of the sleeve 30 or paid off the latter to lie against the inner cylindrical surface of said auxiliary drum depending on whether the cable 14 is being paid out from the main drum or being wound upon it.

Thus it will be seen that the taking up of cable onto the reeling drum is effected very neatly and without twisting of the cable, and it has been found that the direct and positive electrical connection which is made possible by the invention results in very accurate sensing of the load carried by the crane boom.

Various modifications may of course be made without departing from the scope of the invention. For example, instead of being acted upon by spring means to take up slack in the electric cable, the main drum could be acted upon by a permanently stalled D.C. electric motor. It will be understood that a cable reeling drum embodying the invention may advantageously be used in other fields where a direct and positive electrical connection, as opposed to commutator and carbon brush type arrangements, is required.

What we claim and desire to secure by Letters Patent is:

1. An electric cable reeling drum comprising a main drum on which an electric cable is to be wound; spring means acting on said main drum to take up slack in the electric cable; an auxiliary drum mounted eccentrically within said main drum; windings of a connecting wire carried on said auxiliary drum for connecting an end of the electric cable wound on the main drum to fixed electrical apparatus; and a fixed main bobbin at the axis of the main drum to which the connecting wire extends tangentially from the auxiliary drum whereby said connecting wire is wound and paid off the main bobbin according to the direction of rotation of the main drum.

2. An electric cable reeling drum according to claim 1, in which the auxiliary drum is acted on by spring means to take up slack in the connecting wire as it is paid off the main bobbin.

3. An electric cable reeling drum according to claim 1, in which the main bobbin is of a considerably smaller diameter than the auxiliary drum.

4. An electric cable reeling drum according to claim 1, in which the auxiliary drum is of hollow form with several turns of the connecting wire disposed within it and in which an auxiliary bobbin is disposed within said auxiliary drum, said auxiliary bobbin being fixed with respect to the main drum, the arrangement being such that as the auxiliary drum rotates in one direction relative to said main drum the turns of connecting wire within said auxiliary drum are coiled upon the auxiliary bobbin and when the auxiliary drum rotates in the other direction relative to said main drum the turns of connecting wire are paid off the auxiliary bobbin to lie against the inner cylindrical surface of said auxiliary drum.

5. An electric cable reeling drum according to claim 1, for fitment to an extensible boom crane, in which a steel tape is wound on the main drum for connection to an outermost section of the crane boom so that said main drum will be angularly displaced through a distance directly proportional to the length of the boom as the boom is extended and as the boom is retracted.

6. An electric cable reeling drum according to claim 5, including an electrical proportioning device for giving an electrical signal proportional to the overall length of the extensible crane boom in accordance with the angular displacement of the main drum.

* * * * *